Jan. 11, 1966  H. C. EBERLINE  3,229,092
FAST AND SLOW NEUTRON COUNTER
Filed Sept. 8, 1961
FIG. 1
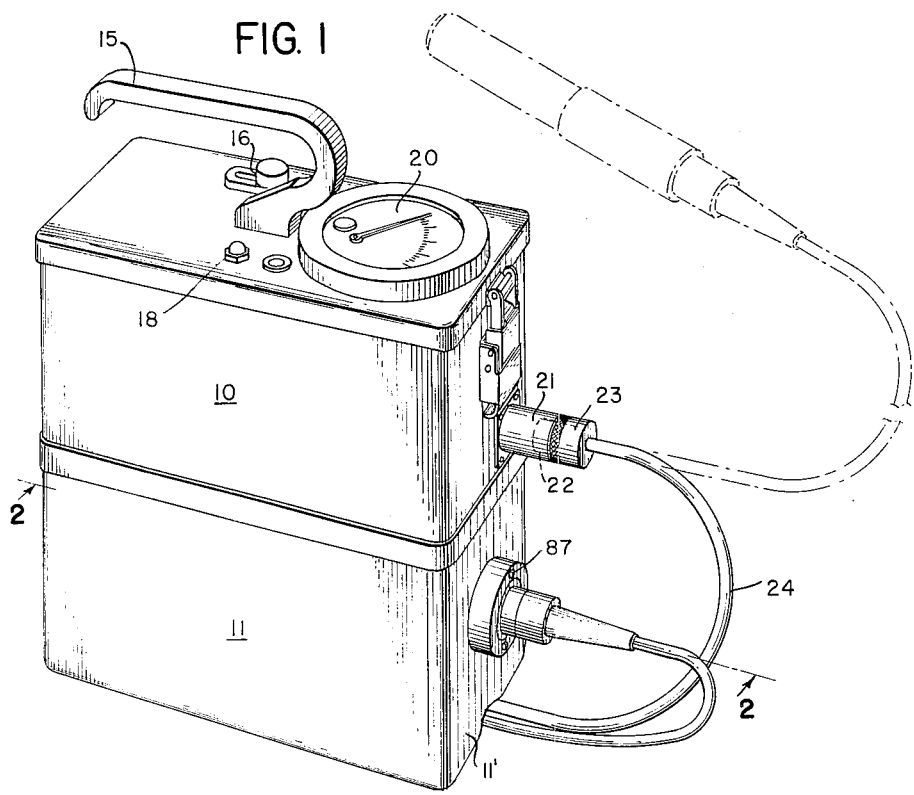
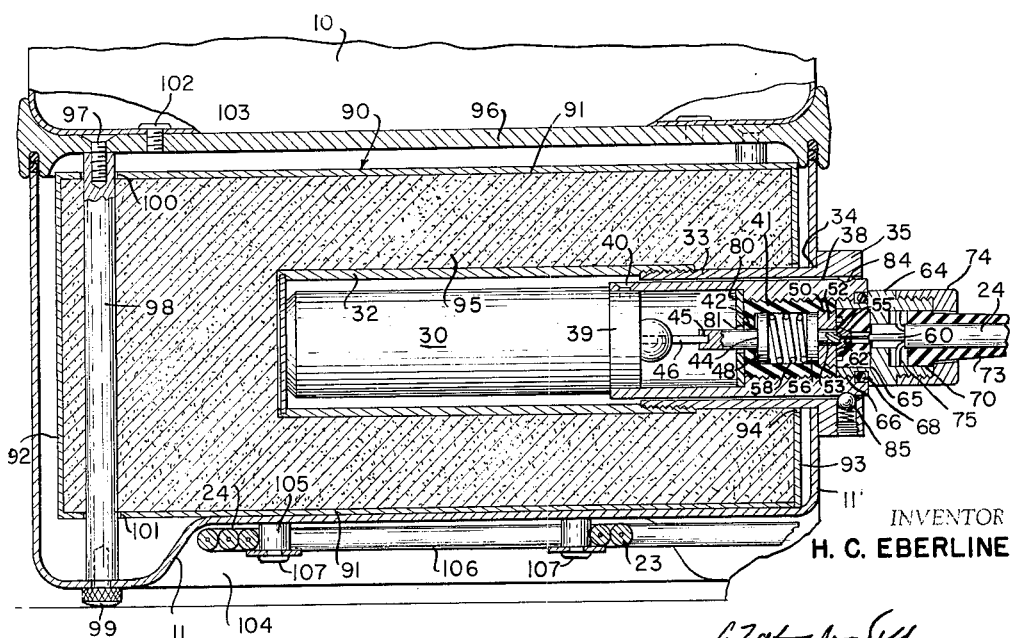
FIG. 2
INVENTOR
H. C. EBERLINE
BY
ATTORNEYS

United States Patent Office 3,229,092
Patented Jan. 11, 1966

3,229,092
FAST AND SLOW NEUTRON COUNTER
Howard C. Eberline, Santa Fe, N. Mex., assignor to Eberline Instrument Corporation, Santa Fe, N. Mex.
Filed Sept. 8, 1961, Ser. No. 136,814
9 Claims. (Cl. 250—83.1)

This invention relates to radiation and more particularly to the detection of and measurement of neutron radiation. In the detection of neutrons it is desirable that highly portable apparatus be available for field monitoring both fast and slow neutrons. The principle of detecting fast and slow neutrons has been previously known, but there has been a need for a lightweight instrument capable of detecting either type and of rugged and simple design for use under variable conditions and by relatively unskilled personnel.

Accordingly, it is an object of the present invention to provide a relatively simple, lightweight, portable instrument for the detection of either fast or slow neutrons.

A further object is to provide a rugged, simple, easy to use instrument which may be operated under a wide variety of conditions for the detection of fast or slow neutrons.

These and other objects of the invention will be apparent from the following description in conjunction with the accompanying drawing, in which FIG. 1 is a perspective of the instrument and illustrating the hand probe in its two operative positions; and FIG. 2, a section to an enlarged scale on the line 2—2 of FIG. 1.

Briefly stated, the invention is embodied in a two-section housing, the upper of which includes the source of power and the detecting and amplifying circuitry. The lower section has an outer housing with a thermal neutron shield and a moderator for fast neutrons, and an inner recess for a removable probe of the proportional chamber type with high efficiency for detecting slow neutrons. The probe is especially constructed for reception within the recess and has an electrical connection for feeding its output to the electrical components in the other section.

With further reference to the drawing, there is illustrated an instrument having upper and lower interconnected housings 10 and 11.

The instrument has a carrying handle 15, a range switch 16 and a meter reset switch 18. The dial of an indicator meter 20 is positioned in the top of the housing 10 for ready visibility.

The upper housing 10 and its electrical components are of the type described in the application of Donald G. Ludlum, Serial No. 777,899, now Patent No. 3,122,635. Briefly, these include a battery pack, high voltage power supply, amplifier, trigger, scaler and meter components. The high voltage is applied to the detector tube whose output is electrically modified to provide a meter reading.

The upper housing 10 has a socket 21 for receiving an input plug 22 from a connector 23 which is fed from the neutron detector coaxial cable 24.

The neutron detector includes a gas filled tube 30 of the gas proportional type, Boron Trifluoride being useful for this purpose, and an operating voltage of 1600 v. D.C. having a high efficiency for slow neutrons. The tube, itself, is preferably of a corrosion resistant material such as brass. The tube is mounted within an aluminum cylinder 32 retained by a sleeve 33 engaged therewith which is snugly received within the opening 34 in one end of the wall 11' of the housing 11, the sleeve having an enlarged outer portion 35 for mounting the tube 30. Within the cylinder 32 and sleeve 33 is an inner cylinder or connector body 38, one end of which is received within a reduced portion 39 of the tube 30, and retained by set screw 40. The other portion of cylinder 38 has internal threads for receiving a contact holder 41 of insulating material such as the plastic polytetra-fluoroethylene.

The contact holder is cup-shaped with an opening 42 at the closed end through which the shaft of high voltage contact probe 44 extends. The high voltage probe is preferably of brass and has a recess 45 at its tip which receives an end of the contact 46 which engages the cap of the reduced portion 39 of the tube 30. The probe 44 has an enlarged head 48 which is received within the bore of the contact holder 41.

At its other end the contact holder has internal threads 50 for receiving a retainer or contact plug 52, preferably of brass. The plug has a central bore 53 which receives the shaft 54 of a high voltage contact connector 55 having an enlarged head 56 which is positioned within the bore of the contact holder 41 and maintained in spaced relation from the high voltage contact probe 44 by a spring 58, preferably of stainless steel. At its outer end the high voltage contact connector 56 has one end of the wire 60 connected thereto and anchored within a plastic or insulating block 62 which is mounted in one end of coupling 64. Coupling 64 has a recess 65 at one end for receiving the plug 62 and such end is reduced and threaded at 66 for reception within the connector body 38. An O-ring 68 is positioned between the connector body and the coupling to provide a seal.

At its outer end the coupling 64 has a recess 70 for receiving an end of the coaxial cable 24 and mounting insulator 73. A cap 74 engages the outer end of the coupling 64 and secures the cable and mounting insulator in place. The cable has a ground shield 75 which extends from beneath the insulation and engages the coupling 64.

It will, therefore, be apparent that the high voltage contact 46 from the tube is connected by high voltage contact probe 44, spring 58, and high voltage contact connector 55 to the wire 60. Contact holder 41 and plug 62 insulate these conductors from the casing which is connected to the ground shield 75 of the cable.

Within the enlarged recess of the connector body and adjacent to the end of the contact holder 41 there is positioned a snugly fitted cadmium disc shield 80 having an enlarged axial opening 81 through which the end of the high voltage contact probe may extend without touching the shield.

In order that the hand probe may be easy to remove and replace, the connector body 38 has a groove 84 at its outer end for receiving a spring-pressed ball 85 mounted in the collar of the detector holder.

The hand probe assembly described is rigidly mounted in the lower housing 11 by fastening means 87 passing through the collar and into the housing.

Within the housing the hand probe assembly is mounted within an inner housing 90 of cadmium which, together with the cadmium disc 80, provide a shield around substantially the entire tube 30. The inner housing 90 has side, bottom and top walls 91, a closed end wall 92 and a remote end wall 93 having an opening 94 through which the hand probe assembly passes into the interior of the housing. The space around the detector housing and the detector holder is filled with a neutron moderator such as paraffin 95. The moderator may be placed in the space around the inner housing 90 and within the lower housing 11, if desired, in order to prevent leakage from the former into the latter.

In order to mount the inner housing 90 within the lower housing 11 and the upper housing secured to the lower housing there is provided an adapter plate 96, which engages the upper edge of the lower housing 11 and is held in place by screws 97 threaded into one end of standoffs or studs 98. The studs 98 are held in an upright position within lower housing 11 by means of fastening screws 99, threaded into the remote ends of studs 98.

The inner housing 90 is provided with spaced openings 100 and 101 in its upper and lower walls through which the studs 98 pass, thus securing the housing 90.

The upper housing 10 is fastened to the adapter plate 96 by means of screws 102 threaded into the adapter plate 96 at 103.

For convenience in the storage of the cable 24, the lower housing has a recess 104 with projections 105 around which the wire may be wrapped, and held in place by I shape retainer plate 106 mounted by screws 107.

In the operation of the device the hand probe is removed from the lower housing for detecting slow neutrons and positioned within the housing for detecting fast neutrons. When the probe is positioned within the housing the cadmium shield stops most of the thermal neutrons. The fast neutrons pass through the cadmium shield and are moderated by the paraffin and can then be detected by the proportional chamber of the hand probe.

The instrument is designed for operation at temperatures from 32° up to 120° F. and is submersible without leaking water into its inner parts.

In operation the proportional tube conducts the current in accordance with the energy received from neutron reaction and a reading is obtained on the gauge which is mounted on the upper housing.

Accordingly, it will be understood that the invention includes a unitary counter for fast or slow neutrons and having a housing with a thermal neutron shield and a fast neutron moderator, and in which the slow neutron proportional tube is removably mounted. The proportional tube constitues a portion of a hand probe which may be conveniently handled manually outside of the housing or positioned therewithin, and in which the effect of the shield and moderator is realized.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A neutron counter usable alternately for the detection of slow and fast neutrons, comprising upper and lower housings, voltage supply, modifying and metering circuits in the upper housing, an inner housing of cadmimum within the lower housing, said inner housing being enclosed except for an opening in a wall thereof, said lower housing having an adjacent corresponding opening, a detector assembly extending into said inner housing through said openings, said assembly being substantially smaller than said inner housing and centrally positioned therewithin to provide a relatively large space around and at one end of said assembly, paraffin moderator within said space, said assembly comprising a cylinder projecting into said inner housing and having a closed end wall within the housing and a removable hand probe releasably mounted in said cylinder, said hand probe comprising a Boron Trifluoride gas-filled proportional chamber having a high voltage contact projecting from its outer end, a connector body engaging the outer end of said proportional chamber, said connector body having a recess within its inner end, a cadmium shield mounted within said recess and having a central opening therethrough, an insulating contact holder mounted within said connector body, said contact holder being substantially cup-shaped and having an opening in its inner end, said inner end being positioned intermediate the ends of said connector body, a high voltage contact probe having a head positioned within said contact holder and a stem projecting through said opening in its inner end and through the opening in said cadmium shield into engagement with said high voltage contact, a retainer plug within the other end of said contact holder, said plug having a cetral bore therethrough, a high voltage contact connector having an enlarged head mounted within said contact holder at the end remote from said probe, conducting spring means mounted in said contact holder and holding said probe and said connector in spaced relation, a coupling mounted on the outer end of said connector body, said coupling having a recess at its inner end and its outer end, a non-conducting plug positioned within the inner recess, cable securing and mounting means positioned within the outer recess, a cap secured to the outer end of the coupling, a cable mounted within said coupling and having its inner wire connected to said contact connector, said cable having insulation about said wire and a grounded shield about said insulation, said grounded shield being connected to said coupling, said cable being connected to said voltage supply circuit.

2. A neutron counter for the detection of slow and fast neutrons, comprising upper and lower housings, voltage supply, modifying and metering circuits in the upper housing, an inner thermal neutron shield within the lower housing, a detector assembly extending into said housing, said assembly being substantially smaller than said housing and centrally positioned therewithin to provide a relatively large space around and at one end of said assembly, a fast neutron moderator within said space, said assembly comprising a mounting projecting into said housing and a removable hand probe releasably carried therewithin, said hand probe comprising a slow neutron efficient proportional chamber having a high voltage contact at its outer end, a connector body engaging an end of said proportional chamber, said connector body having a recess within its inner end, a thermal neutron shield mounted within said recess and having a central opening therethrough, an insulating contact holder mounted within said connector body, said contact holder being substantially cup-shaped and having an opening in its inner end, said inner end being positioned intermediate the ends of said connector body, a high voltage contact probe having a portion positioned within said contact holder and projecting through said opening in its inner end and through the opening in said shield in said recess and engaging said high voltage contact, a retainer within the other end of said contact holder, said plug having a central bore therethrough, a high voltage contact connector having a portion mounted within said contact holder at the end remote from said probe, conducting means mounted in said contact holder and interconnecting said probe and said connector, a coupling mounted on the outer end of said connector body, said coupling having a recess at its inner end and its outer end, a nonconducting plug positioned within the inner recess, cable securing and mounting means positioned within the outer recess, a cap secured to the outer end of the coupling, a cable mounted within said coupling and having its inner wire connected to said contact connector, said cable having insulation about said wire and a grounded shield about said insulation, said grounded shield being connected to said coupling, said cable being connected to said voltage supply circuit.

3. A neutron counter for the detection of slow and fast neutrons, comprising voltage supply, modifying and metering circuits, a housing of thermal neutron shielding material, said housing being enclosed except for an opening in a wall, a detector assembly extending into said housing through said opening, said assembly being substantially smaller than said housing and centrally positioned therewithin to provide a relatively large space around and at one end of said assembly, a fast neutron moderator within said space, said assembly comprising a mounting projecting into said housing and a removable hand probe releasably carried thereby, said hand probe comprising a slow neutron efficient detector having a high voltage contact, a holder for said detector engaging said detector and extending from an end thereof, a thermal neutron shield mounted within said holder and having a central opening, an insulating contact holder mounted within said detector holder, a high voltage contact probe having a portion within said contact holder and projecting through the opening in said shield and engaging said high voltage contact, a high voltage contact connector having a portion within said contact holder, conducting means in said contact holder and connecting said probe and said connector, cable securing and mounting means attached to the outer end of the holder, a cable within said securing and mounting means and having its inner wire connected to said contact connector, said cable having insulation about said wire and a grounded shield about said insulation, said grounded shield being connected to said securing and mounting means, said cable being connected to said voltage supply circuit.

4. A neutron counter usable alternately for the detection of slow and fast neutrons, comprising upper and lower housings, voltage supply, modifying and metering circuits in the upper housing, an inner thermal neutron shield within the lower housing, a detector assembly extending into said lower housing, said assembly being substantially smaller than said housing and centrally positioned therewithin to provide a relatively large space surrounding said assembly, a fast neutron moderator within said space, said assembly comprising a mounting fixed within said housing, a hand probe removably carried within said mounting, said hand probe comprising a slow neutron efficient detector having a high voltage contact, a holder for said detector engaging said detector and extending from an end thereof, a cable secured to said holder, means connecting the cable to said high voltage contact, said cable being connected to said voltage supply circuit.

5. A neutron counter for the detection of slow and fast neutrons, comprising voltage supply, modifying and metering circuits, a housing, said housing being enclosed except for an opening in a wall, a detector assembly extending into said housing through said opening, said assembly being substantially smaller than said housing and centrally positioned therewithin to provide a relatively large space around and at one end of said assembly, a fast neutron moderator within said space, said assembly comprising a mounting projecting into said housing and a removable hand probe releasably carried thereby, said hand probe comprising a slow neutron efficient detector having a high voltage contact, a holder for said detector engaging said detector and extending from an end thereof, an insulating contact holder mounted within said detector holder, a high voltage contact probe having a portion within said contact holder and engaging said high voltage contact, a high voltage contact connector having a portion within said contact holder, conducting means in said contact holder and connecting said probe and said connector, cable securing and mounting means attached to the outer end of the holder, a cable within said securing and mounting means and having its inner wire connected to said contact connector, said cable having insulation about said wire and a grounded shield about said insulation, said grounded shield being connected to said securing and mounting means, said cable being connected to said voltage supply circuit.

6. In a neutron detector for the detection of slow and fast neutrons, a housing, said housing being enclosed except for an opening in a wall, a detector assembly extending into said housing through said opening, said assembly being substantially smaller than said housing and centrally positioned therewithin to provide a relatively large space around and a one end of said assembly, a fast neutron moderator within said space, said assembly comprising a mounting projecting into said housing and a removable hand probe releasably carried thereby, said hand probe comprising a slow neutron efficient detector having a high voltage contact, a holder for said detector engaging said detector and extending from an end thereof, an insulating contact holder mounted within said detector holder, a high voltage contact probe having a portion within said contact holder and engaging said high voltage contact, a high voltage contact connector having a portion within said contact holder, conducting means in said contact holder and connecting said probe and said connector, and cable securing and mounting means attached to the outer end of the holder.

7. A neutron counter usable alternately for the detection of slow and fast neutrons, comprising voltage supply, modifying and metering circuits, a housing having an inner thermal neutron shield, a detector assembly extending into said housing, said assembly being substantially smaller than said housing and centrally positioned therewithin to provide a relatively large space surrounding said assembly, a fast neutron moderator within said space, said assembly comprising a mounting fixed within said housing, a hand probe removably carried within said mounting, said hand probe comprising a slow neutron efficient detector having a high voltage contact, a holder for said detector engaging said detector and extending from an end thereof, a shielded single wire cable secured to said holder, and means connecting the cable wire to said high voltage contact and its shield to said holder, said cable being connected to said voltage supply circuit.

8. In a neutron detector for the detection of slow and fast neutrons, a housing, a detector assembly extending into said housing, said assembly being substantially smaller than said housing and centrally positioned therewithin to provide a relatively large space surrounding said assembly, a fast neutron moderator within said space, said assembly comprising a mounting fixed within said housing, a hand probe removably carried within said mounting, said hand probe comprising a slow neutron efficient detector having a high voltage contact, a holder for said detector engaging said detector and extending from an end thereof, a cable secured to said holder, and means connecting the cable to said high voltage contact.

9. In a neutron detector for the detection of slow and fast neutrons, a housing, a detector assembly extending into said housing, said assembly being substantially smaller than said housing and positioned substantially centrally therewithin to provide a relatively large space surrounding said assembly, a fast neutron moderator within said space, said assembly comprising a mounting fixed within said housing, a hand probe removably carried within said mounting, said hand probe comprising a slow neutron efficient detector, said housing having a thermal neutron shield around its exterior, whereby said probe may be used outside of said housing for detecting slow neutrons and positioned within the housing for detecting fast neutrons, the neutron moderator permitting detection of the fast neutrons by the probe, and the thermal neutron shield stopping most of the thermal neutrons from passage into the housing.

References Cited by the Examiner

UNITED STATES PATENTS

| | | | |
|---|---|---|---|
| 2,769,915 | 11/1956 | Tittle | 250—108 X |
| 2,769,916 | 11/1956 | Tittle | 250—108 X |
| 2,781,453 | 2/1957 | Belcher et al. | 250—83.1 X |
| 2,917,632 | 12/1959 | Anton | 250—83.6 |
| 2,965,759 | 12/1960 | Eberline | 313—93 X |
| 3,011,059 | 11/1961 | Molloy | 250—83.6 |

OTHER REFERENCES

Atomic Energy Commission Radiation Instrument catalog, Survey Meter, SGM-18C, July 1, 1953 (2 pages).

RALPH G. NILSON, *Primary Examiner.*